US010337617B2

(12) United States Patent
Desjardins et al.

(10) Patent No.: US 10,337,617 B2
(45) Date of Patent: Jul. 2, 2019

(54) CANNED SEAL ASSEMBLY (71) Applicant: Trelleborg Sealing Solutions US, Inc., Fort Wayne, IN (US)

(72) Inventors: Derek N. Desjardins, New Haven, IN (US); Samuel D. Wagoner, Woodburn, IN (US); Jeffrey A. Baehl, Fort Wayne, IN (US); Matthew C. Cole, Fresno, CA (US); Harlan H. Hart, Madera, CA (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 416 days.

(21) Appl. No.: 15/065,208

(22) Filed: Mar. 9, 2016

(65) Prior Publication Data
US 2016/0265665 A1 Sep. 15, 2016

Related U.S. Application Data (60) Provisional application No. 62/130,684, filed on Mar. 10, 2015.

(51) Int. Cl.
*F16J 15/34* (2006.01)
*F16J 15/3236* (2016.01)
*F16J 15/3252* (2016.01)
*F16J 15/3268* (2016.01)
*F16C 33/74* (2006.01)

(52) U.S. Cl.
CPC ....... *F16J 15/3236* (2013.01); *F16J 15/3252* (2013.01); *F16J 15/3268* (2013.01); *F16C 33/74* (2013.01)

(58) Field of Classification Search
CPC .. F16J 15/3236; F16J 15/3252; F16J 15/3268; F16J 15/3232; F16C 33/74
See application file for complete search history.

(56) References Cited

U.S. PATENT DOCUMENTS

| 2,702,203 | A | | 2/1955 | Sefren et al. | |
|---|---|---|---|---|---|
| 2,834,616 | A | | 5/1958 | Gebert et al. | |
| 3,099,454 | A | * | 7/1963 | Walinski | F16J 15/3208 277/565 |
| 3,467,448 | A | | 9/1969 | Galle | |
| 3,612,547 | A | * | 10/1971 | Kan | F16J 15/3268 277/563 |
| 4,049,281 | A | * | 9/1977 | Bainard | F16J 15/3256 277/307 |
| 4,176,848 | A | | 12/1979 | Lafuze | |
| 4,360,208 | A | | 11/1982 | Hill et al. | |
| 4,861,172 | A | * | 8/1989 | Rudolf | F16C 21/00 277/353 |

(Continued)

FOREIGN PATENT DOCUMENTS

| JP | 2013096425 A | * | 5/2013 | ............... F16F 9/36 |
|---|---|---|---|---|
| WO | 2011/160657 A1 | | 12/2011 | |

*Primary Examiner* — Eugene G Byrd
(74) *Attorney, Agent, or Firm* — Taylor IP, P.C.

(57) ABSTRACT

A combination seal assembly includes: at least one can structure; a primary seal built onto the at least one can structure and having at least one seal lip; and a scraper seal built onto the at least one can structure and having at least one scraper lip. The at least one can structure supports the primary seal and the scraper seal and allows simultaneous installation of the at least one can structure, the primary seal, and the scraper seal into a hardware space.

15 Claims, 7 Drawing Sheets

(56) References Cited

U.S. PATENT DOCUMENTS

| | | | | |
|---|---|---|---|---|
| 5,058,232 A * | 10/1991 | Stohr | | B23Q 11/0875 |
| | | | | 15/236.01 |
| 5,123,660 A | 6/1992 | Dahlheimer et al. | | |
| 5,207,436 A | 5/1993 | Lederman | | |
| 5,213,342 A | 5/1993 | Weber | | |
| 5,263,404 A * | 11/1993 | Gaucher | | F16J 15/56 |
| | | | | 277/550 |
| 5,421,591 A * | 6/1995 | Katzensteiner | | B60K 17/306 |
| | | | | 277/550 |
| 5,553,866 A | 9/1996 | Heinzen | | |
| 5,908,249 A | 6/1999 | Nisley et al. | | |
| 7,347,424 B2 | 3/2008 | Madigan | | |
| 8,002,287 B2 | 8/2011 | Wagner | | |
| 8,011,671 B2 * | 9/2011 | Madigan | | F16J 15/3268 |
| | | | | 277/551 |
| 8,366,117 B2 * | 2/2013 | Miyake | | F16J 15/3228 |
| | | | | 277/572 |
| 8,756,784 B2 * | 6/2014 | Harmon | | F16J 15/3268 |
| | | | | 277/551 |
| 9,163,731 B2 * | 10/2015 | Sanada | | F16J 15/3228 |
| 9,394,998 B2 * | 7/2016 | Hatch | | F16J 15/3232 |
| 2003/0116920 A1 * | 6/2003 | Friend | | F16J 15/164 |
| | | | | 277/550 |
| 2003/0164592 A1 * | 9/2003 | Friend | | F16J 15/3204 |
| | | | | 277/500 |
| 2004/0119241 A1 * | 6/2004 | Castleman | | F16J 15/3232 |
| | | | | 277/436 |
| 2004/0135320 A1 * | 7/2004 | Schultze | | F16D 3/06 |
| | | | | 277/436 |
| 2007/0158917 A1 * | 7/2007 | Paykin | | F16J 15/064 |
| | | | | 277/551 |
| 2010/0059937 A1 * | 3/2010 | Castleman | | F16J 15/3236 |
| | | | | 277/309 |
| 2011/0169226 A1 * | 7/2011 | Ajiki | | F16J 15/002 |
| | | | | 277/562 |
| 2013/0234397 A1 | 9/2013 | Uehara et al. | | |
| 2013/0234544 A1 | 9/2013 | Haskin | | |
| 2014/0250688 A1 | 9/2014 | Wade et al. | | |
| 2015/0240949 A1 * | 8/2015 | Tones | | F16J 15/3232 |
| | | | | 277/550 |

* cited by examiner

VARIATION 1
Fig. 8A

VARIATION 2
Fig. 8B

VARIATION 1
Fig. 9A

VARIATION 2
Fig. 9B

VARIATION 3
Fig. 9C

VARIATION 1
Fig. 10A

VARIATION 2
Fig. 10B

VARIATION 3
Fig. 10C

VARIATION 4
Fig. 10D

VARIATION 5
Fig. 10E

CANNED SEAL ASSEMBLY

CROSS REFERENCE TO RELATED APPLICATIONS

This is a non-provisional application based upon U.S. provisional patent application Ser. No. 62/130,684, entitled "CANNED SEAL ASSEMBLY", filed Mar. 10, 2015, which is incorporated herein by reference.

BACKGROUND OF THE INVENTION

1. Field of the Invention

The present invention relates to seal assemblies.

2. Description of the Related Art

A seal is a structure included in devices to prevent media from flowing past the seal into other areas of the device. Seals come in a great variety of shapes and sizes, depending on their intended application(s). Seals can be formed of polymers and/or rubber and have one or more seal lips that will perform the sealing function against an element, such as a shaft.

A seal is typically installed within a groove, gland, bore, or other installation feature adjacent to the sealed against element, with the structure of the installation feature being referred to as the "hardware." The hardware provides the necessary support to keep the seal adjacent to the sealed against element, especially in cases where the seal is formed of a soft compound such as rubber.

One problem with installing known seals is that the seals must be adapted to the specific geometry and space requirements of the hardware that will be supporting the seal. This can make installation of the seal difficult, as soft seals tend to deform during installation. Further, the placement of the seal within the hardware must be fairly exact to ensure the seal is properly supported by the hardware during operation, with improper placement possibly leading to insufficient support and/or the development of leak paths. Proper placement can be especially difficult if the seal incorporates more than one seal element, such as a combination seal incorporating a primary seal and a scraper (also known as a "wiper") seal which scrapes material off the sealed-against element. In addition, the space required for both a primary seal and a scraper seal to be adequately separated at all times, in order to insure proper operation, often increases the size and weight of components.

What is needed in the art is a seal assembly that addresses some of the known issues of prior art seal assemblies.

SUMMARY OF THE INVENTION

The present invention provides a primary seal and a scraper seal built onto one or more can structures which support the primary seal and scraper seal and allow the can structure(s), primary seal, and scraper seal to be simultaneously installed into a hardware space.

The invention in one form is directed to a combination seal assembly including: at least one can structure; a primary seal built onto the at least one can structure and having at least one seal lip; and a scraper seal built onto the at least one can structure and having at least one scraper lip. The at least one can structure supports the primary seal and the scraper seal and allows simultaneous installation of the at least one can structure, the primary seal, and the scraper seal into a hardware space.

An advantage of the present invention is the scraper structure acts as the hardware for the primary seal and scraper seal, ensuring that the seals are sufficiently supported after installation.

Another advantage is the scraper structure can provide rigidity to the primary seal and the scraper seal which can simplify installation of the primary seal and scraper seal into a hardware space.

Yet another advantage is the can structure can be adapted to specific hardware spaces without affecting the structure and sealing characteristics of the primary seal and scraper seal.

Yet another advantage is the can structure can support a large variety of sealing elements.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
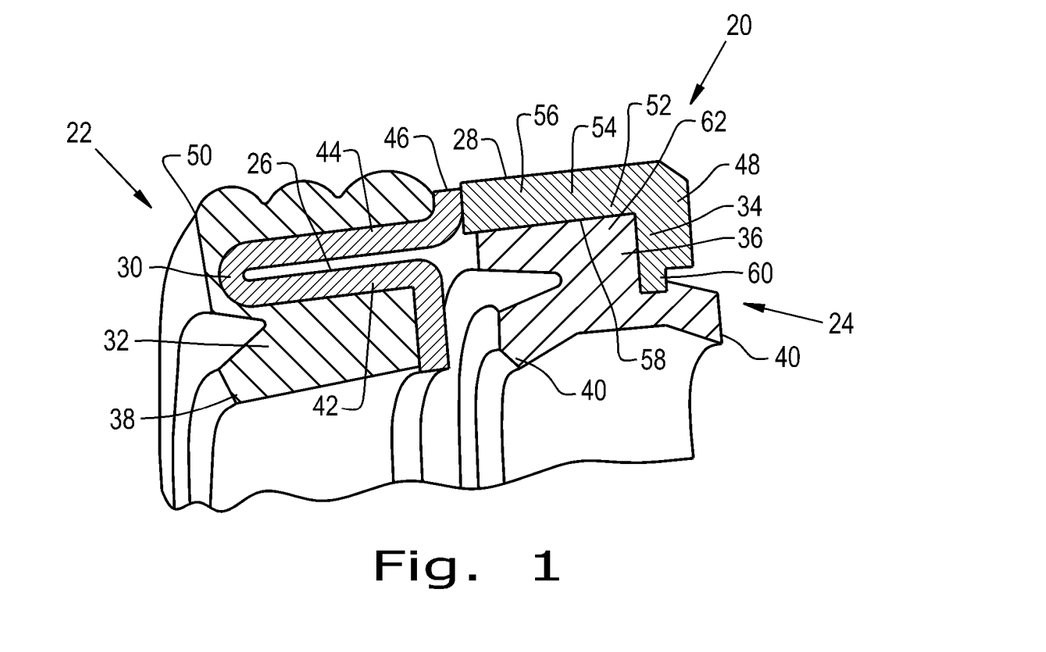
FIG. 1 is a cross-sectional view of an embodiment of a combination seal assembly formed according to the present invention.

Referring now to the drawings, and more particularly to FIG. 1, there is shown a combination seal assembly 20 which generally includes a canned seal 22 and a canned scraper 24 held with the canned seal 22. As can be seen, the canned seal 22 includes a seal can 26, which can be formed of a metal, plastic, or other suitable material, with an outer diameter portion 28 and a bonding portion 30 that is partially surrounded by a primary seal 32, which can be formed of a rubber, soft thermoplastic, or other polymer material and built onto the seal can 26. The canned scraper 24 includes a scraper can 34, which can also be formed of a metal, plastic or other suitable material, that is partially surrounded by a scraper seal 36, which can also be formed of a rubber, other polymer, and/or metal material and built onto the scraper can 34. The primary seal 32 has one or more seal lips 38 and the scraper seal 36 has one or more scraper lips 40, as is known in the art. It should be appreciated that the "scraper seal" referenced throughout can also be referred to as a "wiper" or "wiper seal," in accordance with known nomenclature for such components.

The seal can 26, as shown in FIG. 1, includes a bonding portion 30 and an outer diameter portion 28. The bonding portion 30, as shown, can be formed as a double walled ring with an inner ring wall 42 and an outer ring wall 44 that are both surrounded by the primary seal 32. This configuration can be adjusted, as desired, to give suitable surface contact area for the primary seal 32 to be built onto the bonding portion 30 of the seal can. The outer diameter portion 28 of the seal can 26 is connected to the bonding portion 30 but is not surrounded by the primary seal 32. The outer diameter portion 28 can be an annular ring, as shown, that is connected to the bonding portion 30 at one end 46 and has a can lip 48 formed at an end opposite the end 46 connected to the bonding portion 30. The can lip 48 can extend radially inward, relative to an outer surface of the outer diameter portion 28, so that it forms a cup between the can lip 48 and the bonding portion 30 of the seal can 26. As the formed cup allows for the canned scraper 24 to be pressed within and has an annular shape, the formed cup can be referred to as an exterior annular cup.

The primary seal 32, as shown in FIG. 1, is an annular ring with an inner seal lip 38 that can be in contact with a rod (not shown) when the seal assembly 20 is installed and an outer seal lip 50 that can be in contact with a bore (not shown) when the seal assembly 20 is installed. Having the outer seal lip 50 in contact with the bore provides a static seal to prevent fluid leaking between the seal can 26 and the bore (not shown). It should be appreciated that the profile of the primary seal 32 shown is exemplary only and that the primary seal 32 can be formed with any desired seal shape to achieve best sealing practices for the particular application of the seal assembly 20. The primary seal 32 is built onto the seal can 26 so that the primary seal 32 envelops part of the bonding portion 30 of the seal can 26 and forms a tight bond with the bonding portion 30. The material of the primary seal 32 can be, for example, molded onto the seal can 26 in a molten or pliable state so that as the primary seal 32 material cools or hardens, it bonds to the surface of the bonding portion 30 of the seal can 26. This allows for the canned seal 22 to be formed as an integral piece, rather than separable pieces, so the seal can 26 supports the primary seal 32 and allows the primary seal 32 and seal can 26 to be installed into a hardware space simultaneously. To support the primary seal 32, the seal can 26 can be formed of a material with a higher yield strength than the primary seal 32 so the seal can 26 is more rigid than the primary seal 32 as well as less prone to being permanently deformed. The seal can 26 can comprise, for example, a metal such as stainless steel, a high strength composite such as fabric or fiber reinforced resin, or a high strength plastic such as polyether ether ketone (PEEK).

The scraper can 34, as shown in FIG. 1, has a similar shape to the outer diameter portion 28 of the seal can 26, but with smaller dimensions to allow for the scraper can 34 to be press fit and tightly held against an inner diameter of the outer diameter portion 28 of the seal can 26. In this sense, the outer diameter portion 28 and can lip 48 of the seal can 26 act as a cup for the scraper can 34. The scraper can 34 has an articulating portion 52 with an outer surface 54 that is held against an inner surface 56 of the outer diameter portion 28 of the seal can 26 and an inner surface 58 that is surrounded by the material of the scraper seal 36. The scraper can 34 also has a lip 60 that is complementary to and presses against the can lip 48 of the seal can 26 and helps keep the scraper can 34 and associated scraper seal 36 held with the canned seal 22. While not shown, it is contemplated that the scraper can 34 could also be larger than the seal can 26, so that the seal can 26 is held within the scraper can 34. In such a configuration, the scraper can 34 may have a mirrored configuration to the seal can 26 shown in FIG. 1 and the seal can 26 may have a mirrored configuration to the scraper can 34 shown in FIG. 1 so that the primary seal 32 can be formed onto a smaller seal can and the scraper seal 36 can be formed onto a larger scraper can while maintaining a similar relative position within the seal assembly. To support the scraper seal 36, the scraper can 34 can be formed of a material with a higher yield strength than the scraper seal 36 so the scraper can 34 is more rigid than the scraper seal 36 as well as less prone to being permanently deformed. The scraper can 34 can comprise, for example, a metal such as stainless steel, a high strength composite such as fabric or fiber reinforced resin, or a high strength plastic such as polyether ether ketone (PEEK).

The scraper seal 36, as shown in FIG. 1, is formed onto the scraper can 34 similarly to the primary seal 32 that is formed onto the seal can 26. The scraper seal 36 can include a bonded portion 62 to the scraper can 34 and a pair of scraper lips 40 at opposing ends of the scraper seal 36. The scraper lips 40 can have differing profiles depending on the desired performance characteristics, which will be further described herein.

As can be seen, the canned seal 22 surrounds the canned scraper 24 to form the seal assembly 20. This allows for an all-in-one assembly that has outer diameter and inner diameter sealing built-in. Further, each can 26, 34 acts as "hardware" for its respective primary seal 32 and scraper seal 36, providing support and structure for the seal assembly 20 and allowing the assembly 20 to be pressed into place in a simple open gland. Further, the seal assembly 20 can be configured in many different ways to provide best sealing practices, with reference to the examples described further herein.

Figure 2:
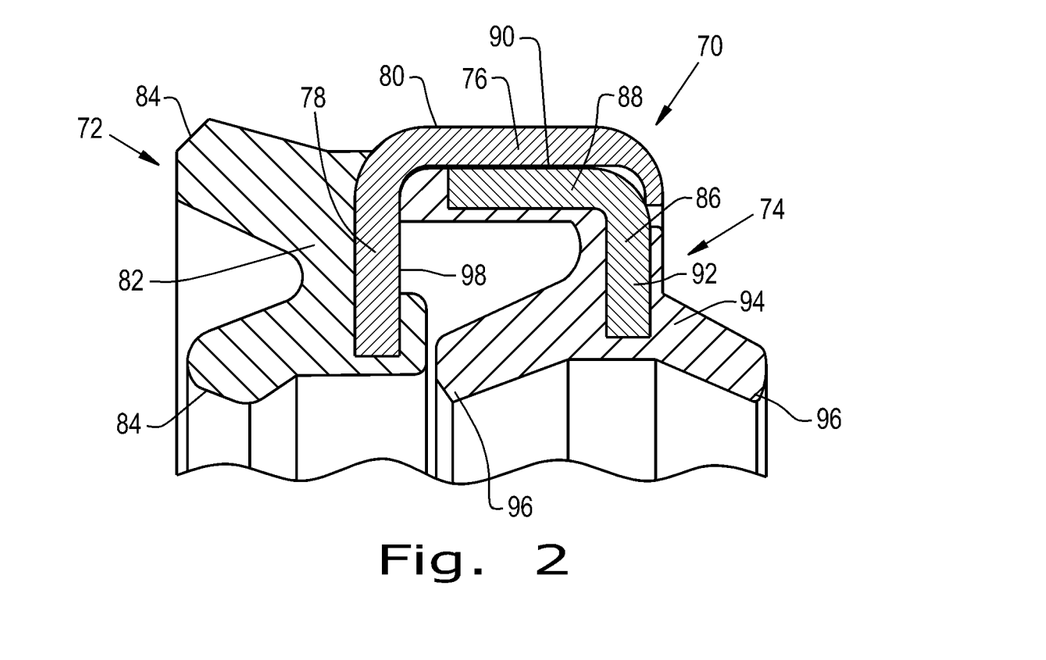
FIG. 2 is a cross-sectional view of another embodiment of a combination seal assembly formed according to the present invention.

Referring now to FIG. 2, another embodiment of a seal assembly is shown with a canned seal 72 and a canned scraper 74 held with the canned seal 72. The canned seal 72 includes a seal can 76, which generally has the shape of an annular ring with an open side wall, with a bonding portion 78, an outer diameter portion 80 connected at one end to the bonding portion 78, and a can lip 82 formed at an end of the outer diameter portion 80 opposite the bonding portion 78. The canned seal 72 also includes a primary seal 82 that is formed onto the bonding portion 78, similar to the previously described primary seal 32, and has a pair of seal lips 84. The bonding portion 78 of the seal can 76 shown in FIG. 2 does not have a double wall like the seal can 26 shown in FIG. 1, but rather is an annular side wall of the seal can 76. The canned scraper 74 includes a scraper can 86, which has the shape of an annular ring with an open side wall, with an articulating portion 88 that presses against an interior surface 90 of the outer diameter portion 80 of the seal can 76 and a lip 92 that is mostly surrounded by the material of a scraper seal 94 which is formed onto the scraper can 86, similar to the previously described scraper seal 36. The scraper seal 94 has two scraper lips 96 that are opposed to one another. The leftmost of the two lips 96 in the scraper seal 94 is a secondary sealing lip. The space between the primary and secondary sealing lips 94 is sometimes critical to achieve a pocket of low pressure lubrication that can be thin enough to be sealed but thick enough to provide enough lubrication to the primary, secondary, and wiper lips 84, 96 to keep friction and wear at optimum targets. Part of the scraper seal 94 can press against an interior surface 98 of the bonding portion 78 of the seal can 76 and a portion of the primary seal 82 can rest adjacent to one of the scraper lips 96.

Figure 3:
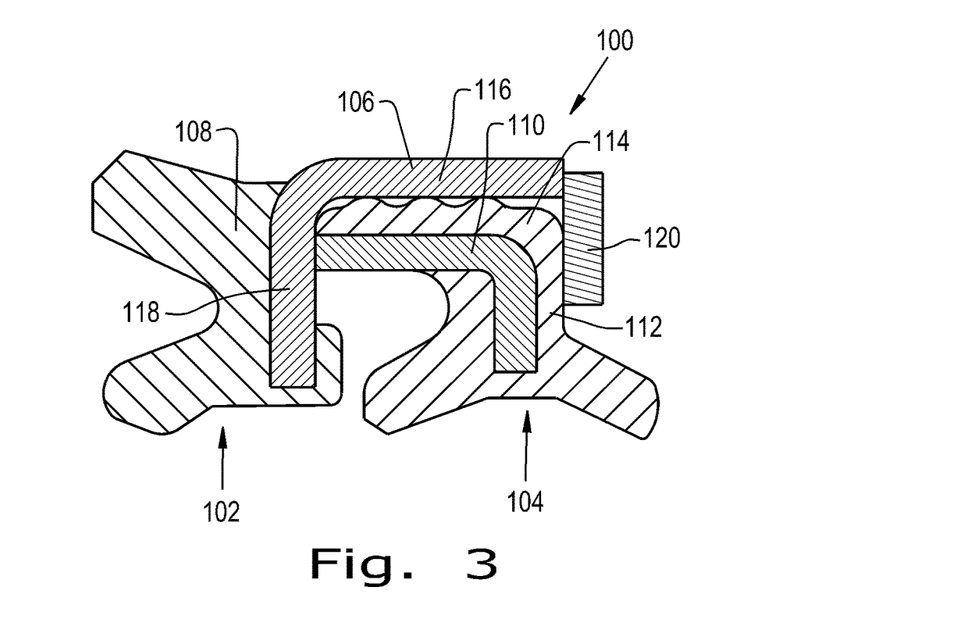
FIG. 3 is a cross-sectional view of yet another embodiment of a combination seal assembly formed according to the present invention.

Referring now to FIG. 3, another embodiment of a seal assembly 100 is shown that includes a canned seal 102 and a canned scraper 104. As can be seen, the canned seal 102 is configured similarly to the canned seal 72 shown in FIG. 2 in that it includes a seal can 106 and a primary seal 108 formed onto the seal can 106, except that the seal can 106 shown in FIG. 3 lacks a can lip like the seal can 76 shown in FIG. 2. The canned scraper 104 includes a scraper can 110 and a scraper seal 112 formed onto the scraper can 100. Unlike previously described canned scrapers, the canned scraper 104 shown in FIG. 3 has a contact portion 114 of the scraper seal 112 in between an outer diameter portion 116 of the seal can 106 and the scraper can 110, so that the scraper can 110 contacts the seal can 106 on a bonding portion 118 of the seal can 106. The canned scraper 104 is press fit against the canned seal 102 by a snap ring 120 pressed against the outer diameter portion 116 of the seal can 106, acting analogously to the can lip 48, 92 shown in FIGS. 1 and 2. Other retention techniques can be applicable, but the seal assembly 100 is installed as one assembly before any additional retention device(s) (if necessary) is installed.

Figure 4:
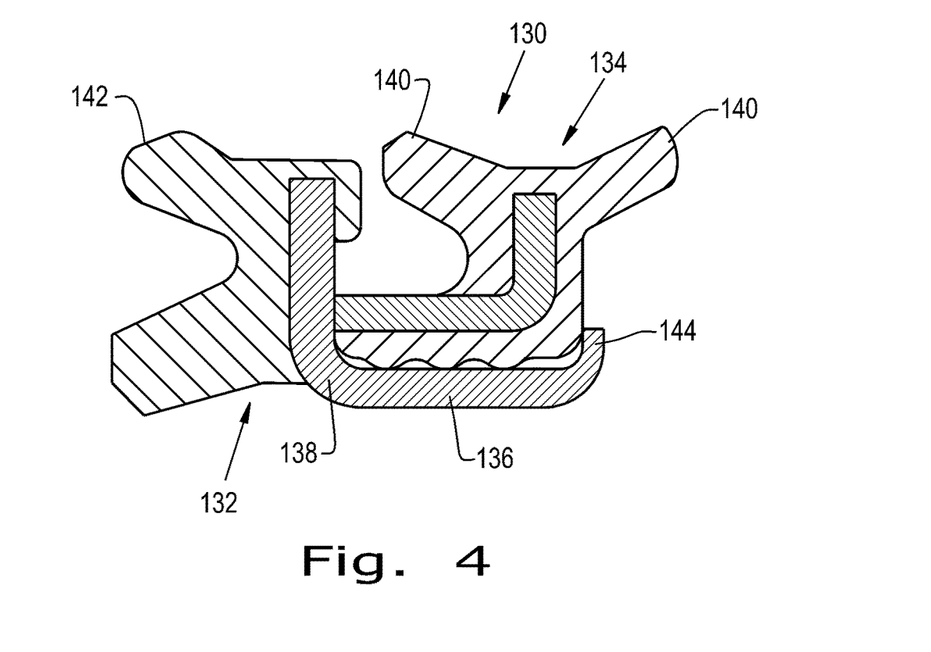
FIG. 4 is a cross-sectional view of yet another embodiment of a combination seal assembly formed according to the present invention.

Referring now to FIG. 4, another embodiment of a seal assembly 130 is shown that includes a canned seal 132 and a canned scraper 134. As can be seen, the seal assembly 130 shown in FIG. 4 is similar to the seal assembly 100 shown in FIG. 3, but reversed so that an outer diameter portion 136 of a seal can 138 is placed against a shaft outer diameter (not shown) and scraper lips 140 and one seal lip 142 is placed against a bore (not shown). The seal can 138 also includes a can lip 144 to hold the canned scraper 134 with the canned seal 132. Such a seal assembly 130 configuration allows for primary sealing on the bore, as opposed to on the shaft as the seal assembly 100 shown in FIG. 3 would seal. In this sense, the seal can 138 forms an interior annular cup to hold the canned scraper 134, rather than an exterior annular cup like the seal can 106 shown in FIG. 3, so the seal can 138 defines an innermost portion of the canned seal 132.

Figure 5:
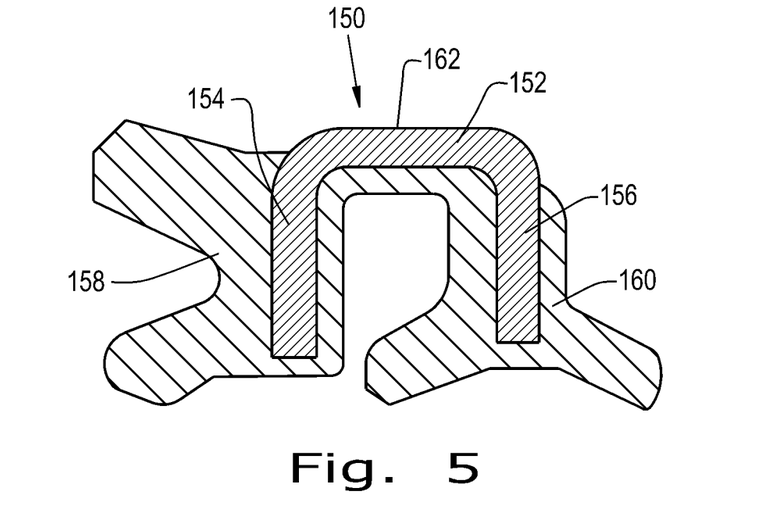
FIG. 5 is a cross-sectional view of yet another embodiment of a combination seal assembly formed according to the present invention.

Referring now to FIG. 5, another embodiment of a seal assembly 150 is shown that includes a single can 152 with a seal bonding portion 154 and a scraper bonding portion 156, a primary seal 158 built onto the seal bonding portion 154 and a scraper seal 160 formed onto the scraper bonding portion 156. In this embodiment, the can 152, primary seal 158 and scraper seal 160 are all formed together as an integral piece. The can has an outer diameter portion 162 that can be placed against an inner diameter of a bore (not shown) when the seal assembly 150 is installed. The primary seal 158 and scraper seal 160 can be built onto the can 152 to have shapes and profiles that are similar to other previously described seals or in ways that will be further described herein.

Figure 6:
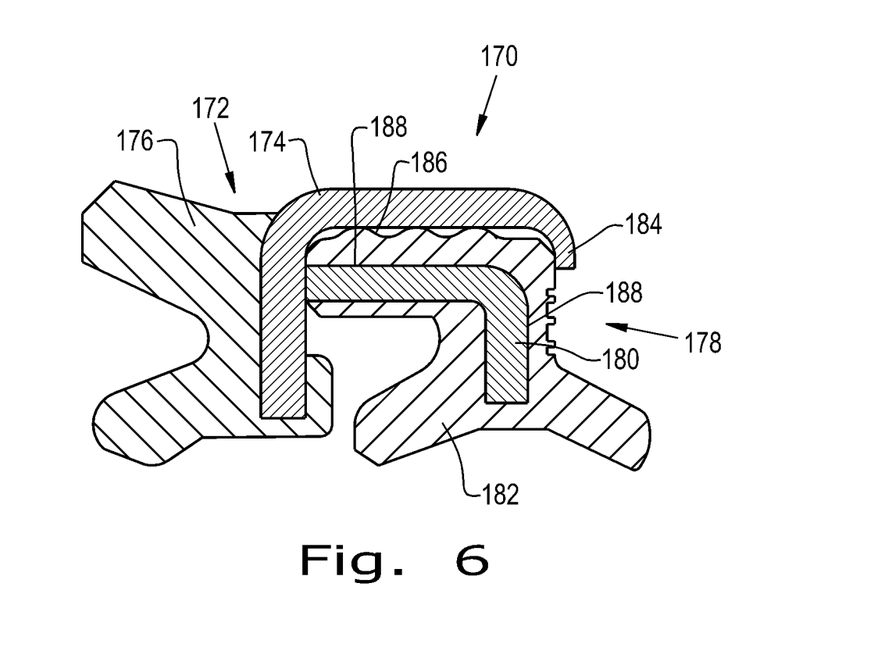
FIG. 6 is a cross-sectional view of yet another embodiment of a combination seal assembly formed according to the present invention.
Figure 7:
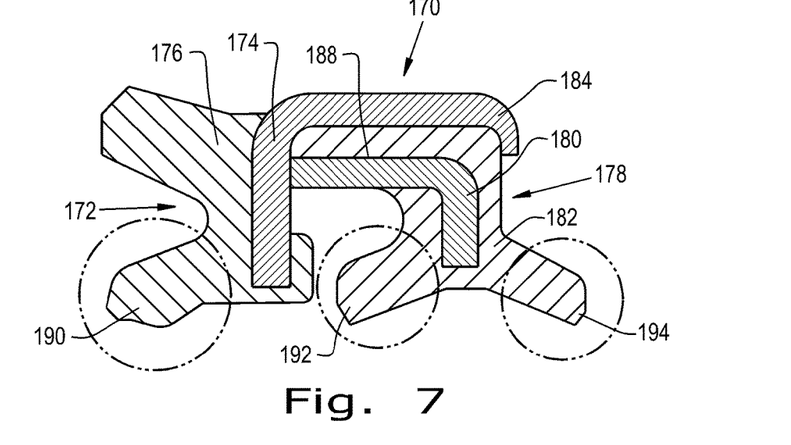
FIG. 7 is a cross-sectional view of yet another embodiment of a combination seal assembly formed according to the present invention.
Figure 8A:
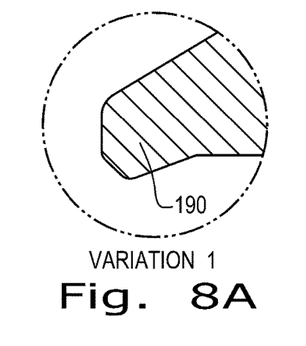
FIG. 8A is a cross-sectional view of an embodiment of a seal lip formed according to the present invention.
Figure 8B:
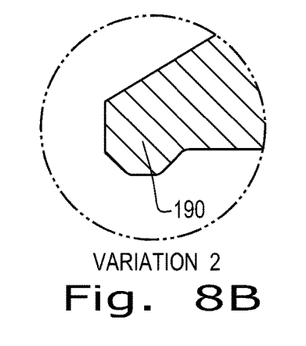
FIG. 8B is a cross-sectional view of another embodiment of a seal lip formed according to the present invention.
Figure 9A:
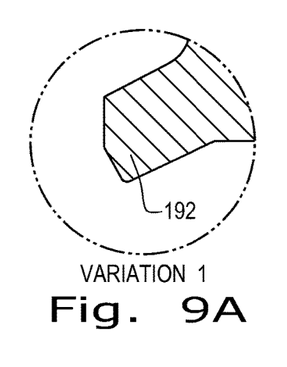
FIG. 9A is a cross-sectional view of an embodiment of a scraper lip formed according to the present invention.
Figure 9B:
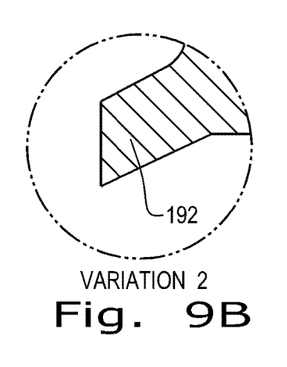
FIG. 9B is a cross-sectional view of another embodiment of a scraper lip formed according to the present invention.
Figure 9C:
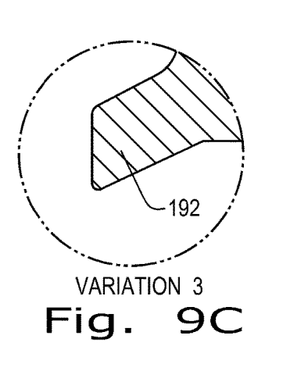
FIG. 9C is a cross-sectional view of yet another embodiment of a scraper lip formed according to the present invention.
Figure 10A:
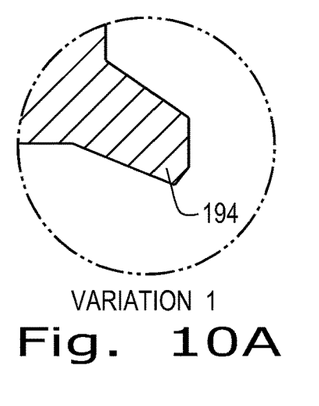
FIG. 10A is a cross-sectional view of yet another embodiment of a scraper lip formed according to the present invention.
Figure 10B:
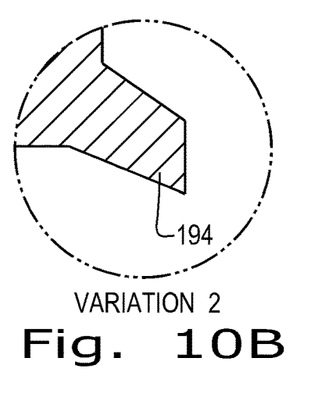
FIG. 10B is a cross-sectional view of yet another embodiment of a scraper lip formed according to the present invention.
Figure 10C:
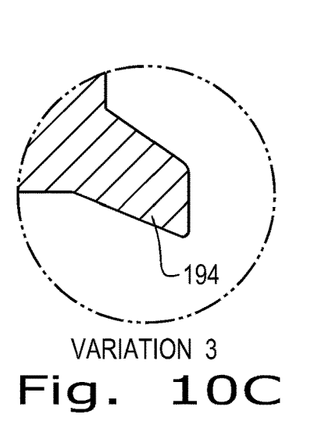
FIG. 10C is a cross-sectional view of yet another embodiment of a scraper lip formed according to the present invention.
Figure 10D:
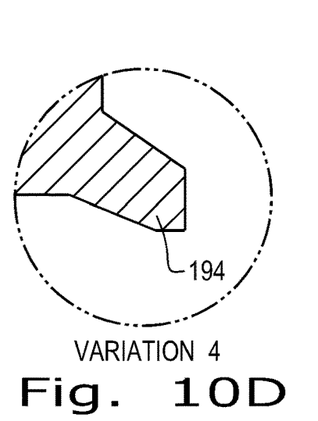
FIG. 10D is a cross-sectional view of yet another embodiment of a scraper lip formed according to the present invention.
Figure 10E:
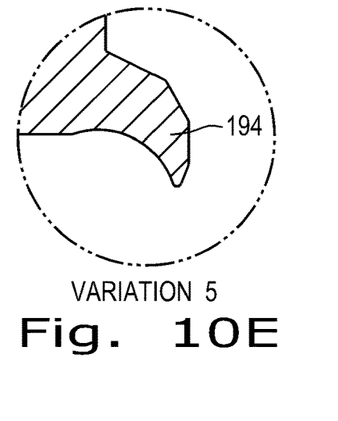
FIG. 10E is a cross-sectional view of yet another embodiment of a scraper lip formed according to the present invention.

Referring now to FIG. 6, another embodiment of a seal assembly 170 is illustrated that is similar to the seal assembly 100 shown in FIG. 3. As can be seen, the seal assembly 170 shown in FIG. 6 includes a canned seal 172 that includes a seal can 174 and a primary seal 176 built onto the seal can 174, and a canned scraper 178 with a scraper can 180 and a scraper seal 182 built onto the scraper can 180. The seal can 174 includes a can lip 184 to hold the canned scraper 178 with the canned seal 172. The scraper seal 182 can have sealing material with or without ribs 186 on all or a portion of an outer diameter 188 of the scraper can 180 to help prevent leakage between the scraper can 180 and the seal can 174.

Referring now to FIGS. 7-10 E, the seal assembly 170 shown in FIG. 6 is shown without ribs 188. The primary seal 176 has a seal lip 190 that can have different profiles, as illustrated in FIGS. 8A and 8B, so that the seal lip 190 has a small radius or a flat contact band to give different sealing, wear, and friction characteristics. Similarly, the scraper seal 182 can have a first scraper lip 192 and a second scraper lip 194 that can have varying profiles. The first scraper lip 192, for example, can have a small radius as shown in FIGS. 9A and 9C or be sharp as shown in FIG. 9B. The second scraper lip 194 can have, for example, a sharp lip as shown in FIGS. 10A and 10B, a small radius as shown in FIG. 10C, a flat contact band as shown in FIG. 10D, or a hook as shown in FIG. 10E. It should be appreciated that these illustrated lip profiles are exemplary only and that the profiles can be shaped in other ways to achieve the desired sealing and scraping characteristics.

Figure 11:
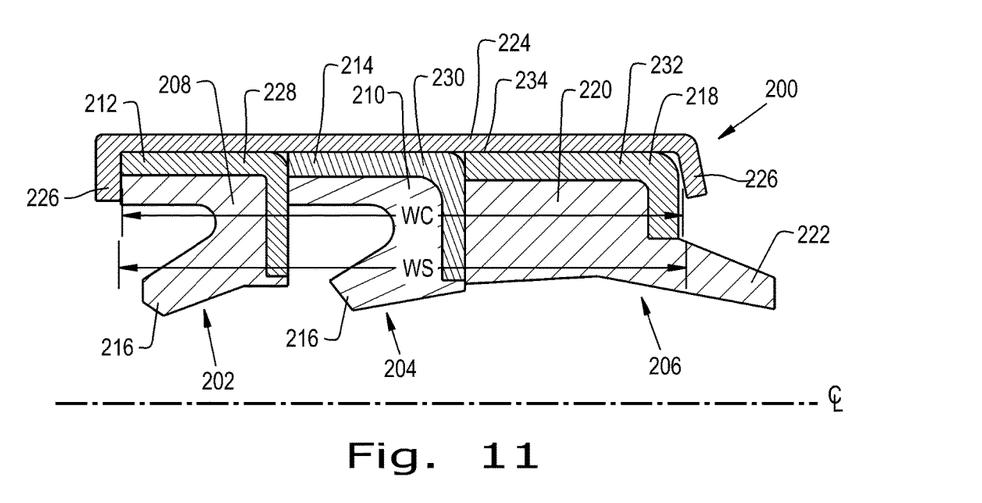
FIG. 11 is a cross-sectional view of yet another embodiment of a combination seal assembly formed according to the present invention which includes a secondary seal.

While previously described seal assemblies 20, 70, 100, 130, 150, and 170 include one canned seal with a canned scraper, more than one canned seal can be included in a seal assembly. Referring now to FIG. 11, a seal assembly 200 is shown that includes a primary canned seal 202, a secondary canned seal 204, and a canned scraper 206 held with the primary canned seal 202 and secondary canned seal 204. As can be seen, the primary canned seal 202 and secondary canned seal 204 each include a respective seal 208, 210 formed onto a seal can 212, 214. The seals 208, 210 of the primary and secondary canned seal 202, 204 can have one or more seal lips 216 and be different from one another to have different sealing characteristics, or similar so that the secondary canned seal 204 can serve as a backup seal to the primary canned seal 202 in the event of a failure. The seal cans 212, 214 of the primary and secondary canned seal 202, 204 can be similar, as shown, or different, depending on the desired bonding characteristics of the seal 208, 210 to the seal can 212, 214. The seal cans 212, 214 and seals 208, 210 of the primary and secondary canned seal 202, 204 can also be adjusted, as desired, similar to previously described seal cans and primary seals. The canned scraper 206 includes a scraper can 218 and a scraper seal 220 built onto the scraper can 218 and having a scraper lip 222. The scraper seal 220 and scraper can 218 are adjustable, as desired, similar to previously described scraper seals and scraper cans. A casing 224, which can be formed of a metal or a polymer and is shown as having an annular ring shape with open, lipped side walls 226, can hold the primary canned seal 202, secondary canned seal 204, and canned scraper 206 together. To do so, the secondary canned seal 204 can be sandwiched between the primary canned seal 202 and canned scraper 206 so that the primary canned seal 202, secondary canned seal 204 and canned scraper 206 are held against each other in the casing 224 with their respective cans 212, 214, 218 having outer diameter portions 228, 230, 232 that are pressed against an inner diameter 234 of the casing 224. As it is useful to have the primary canned seal 202, secondary canned seal 204 and canned scraper 206 tightly held together, a width WC of the casing 224 between the lipped side walls 226 can be approximately equal to or slightly smaller than a combined width WS of the primary canned seal 202, secondary canned seal 204 and canned scraper 206.

Figure 12:
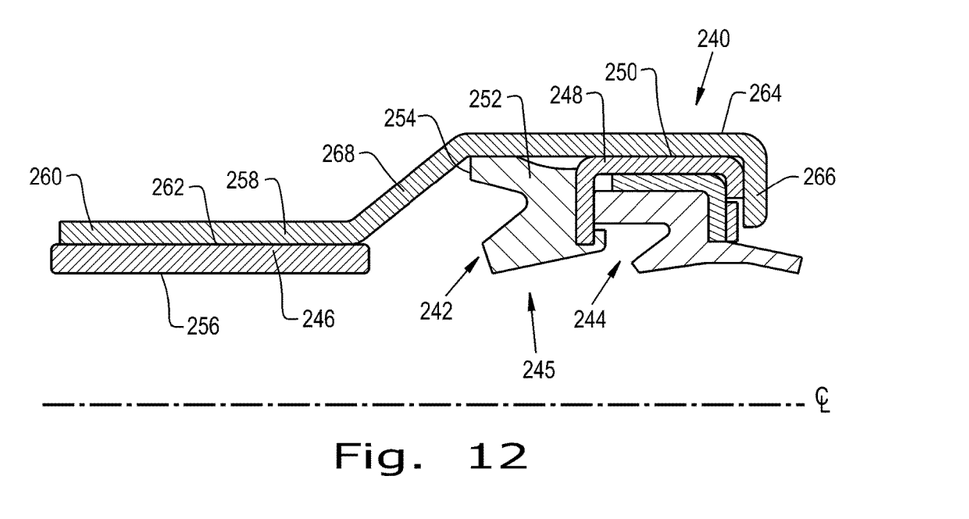
FIG. 12 is a cross-sectional view of yet another embodiment of a combination seal assembly formed according to the present invention which includes a bearing.

Seal assemblies according to the present invention can also include other components held with one or more canned seals and canned scrapers. Referring now to FIG. 12, a seal assembly 240 is shown that includes a canned seal 242, a canned scraper 244 held with the canned seal 242, and a bearing 246, shown as an annular ring, held with the canned seal 242 and canned scraper 244. The canned seal 242 and canned scraper 244 can be configured and held together similarly to previously described canned seals and canned scrapers to form a seal package 245 with a seal can 248 of the canned seal 242 that has an outer diameter 250 acting as an articulating surface and a primary seal 252 with a radially outer seal lip 254. The seal package 245 and bearing 246 can be placed on a shaft or other element so that the outer diameter 250 of the seal can 248 and outer seal lip 254 of the primary seal 252 are opposite surfaces that contact the shaft and an inner surface 256 of the bearing 246 contacts the shaft. To hold the seal package 245 and bearing 246 together, the seal package 245 and bearing 246 are placed within an assembly can 258 which holds the seal assembly 240 together. The assembly can 258 may be formed of a metal material, similar to previously described cans. The assembly can 258 has a bearing portion 260 with an inner surface that is pressed against an outer diameter 262 of the bearing 246 and a package portion 264 with an inner surface that is pressed against the outer diameter 250 of the seal can 248 and the radially outer seal lip 254. The assembly can 258 also has an assembly lip 266 connected to the package portion 264 that is formed in a radially inward direction to keep the seal package 245 held with the assembly can 258. The assembly can 258 may have a transition area 268 connecting the package portion 264 and bearing portion 260. Such a configuration may be necessary when the bearing 246 has a significantly lower overall thickness than the seal package 245, as shown, so that the assembly can 258 is pressed against both the bearing 246 and seal package 245. To form the seal assembly 240, the seal package 245 and bearing 246 can be placed on the shaft according to normal installation procedures before the assembly can 258 is pressed onto the seal package 245 and bearing 246. Alternatively, the seal package 245 and bearing 246 can be pressed into the assembly can 258 prior to installation.

Figure 13:
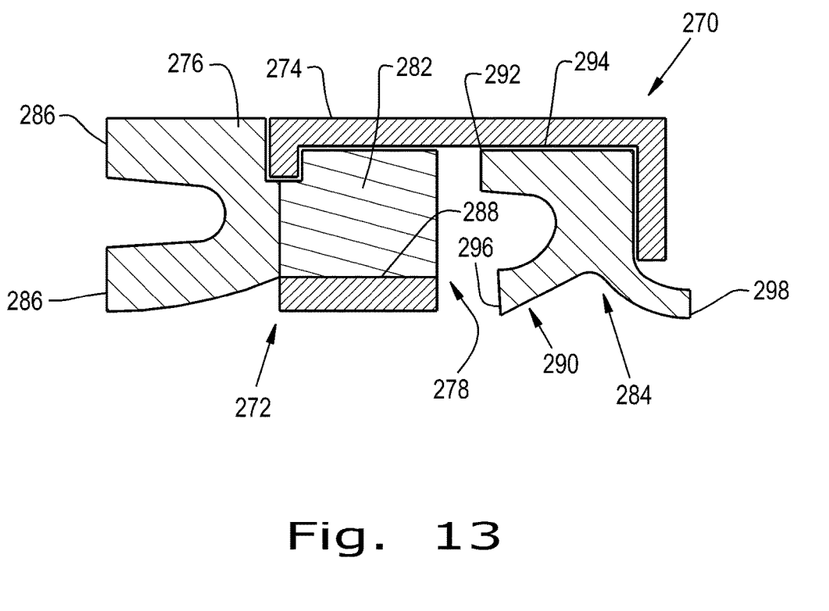
FIG. 13 is a cross-sectional view of yet another embodiment of a combination seal assembly formed according to the present invention which includes a bearing and a bearing support element.

In another embodiment of a seal assembly 270 formed according to the present invention, the canned seal or canned wiper can be bonded to a larger center bearing section, with the seal or wiper can securing all the components together as one assembly. As shown in FIG. 13, the seal assembly 270 includes a canned seal 272 with a seal can 274 and a primary seal 276 formed onto the seal can 274, a bearing section 278 including a bearing 280 and a bearing support 282 formed onto the seal can 274, and a scraper seal 284 held with the primary seal 276 and bearing section 278 by the seal can 274. As can be seen, the primary seal 276 can include a pair of primary seal lips 286 that can be configured similarly to previously described seal lips. The bearing 280, shown as an annular ring, has a relatively low thickness compared to the primary seal 276. The bearing support 282, shown as being held against an outer diameter 288 of the bearing 280, compensates for the bearing's low thickness to help hold the bearing 280 together with the other components to form the seal assembly 270. The scraper seal 284, as shown, includes a secondary primary seal 290 with a first secondary seal lip 292 that contacts an inner diameter 294 of the seal can 274 and a second secondary seal lip 296 that contacts an element, such as a rod, in the sealing environment. The second seal lips 292, 296 can be configured similarly to previously described secondary seal lips. The scraper seal 284 also includes a scraper lip 298 formed on an end of the scraper seal 284 opposite the second secondary seal lip 296 and can be configured similarly to previously described scraper lips. While not shown, it should be appreciated that the bearing section 278 can also be bonded to a scraper can of a canned scraper seal that is configured similarly to previously described scraper seals, with the scraper can of the canned scraper seal holding a primary seal and/or secondary seal together with the bearing section and canned scraper seal to form a seal assembly.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combination seal assembly, comprising:
    at least one can structure; wherein the at least one can structure includes a bonding portion, said at least one can structure including a seal can and a scraper can;
    a primary seal built onto said seal can and having at least one seal lip, wherein the primary seal envelops part of the bonding portion of the at least one can structure and forms a tight bond with the bonding portion; and
    a scraper seal built onto said scraper can and having at least one scraper lip, said at least one can structure supporting said primary seal and said scraper seal and allowing simultaneous installation of said at least one can structure, said primary seal, and said scraper seal into a hardware space, said seal can including a seal can lip and said scraper can including a scraper can lip that extends generally parallel to said seal can lip, has at least a portion surrounded by said scraper seal, and is longer than said seal can lip, said seal can being exterior to said scraper can and said seal can lip being configured to hold said seal can, said primary seal, said scraper can, and said scraper can lip together.

2. The combination seal assembly according to claim 1, wherein said scraper can is press fit against said seal can.

3. The combination seal assembly according to claim 2, further comprising a snap ring press fitting said scraper can against said seal can.

4. The combination seal assembly according to claim 1, wherein at least one of said seal can and said scraper can comprises a can material and at least one of said primary seal and said scraper seal comprises a seal material, said can material having a higher yield strength than said seal material.

5. The combination seal assembly according to claim 4, wherein said can material is at least one of a metal, a composite, and a plastic.

6. The combination seal assembly according to claim 1, wherein a portion of said scraper seal is pressed between said seal can and said scraper can.

7. The combination seal assembly according to claim 1, wherein said scraper seal and said scraper can both contact an interior surface of said seal can.

8. The combination seal assembly according to claim 1, wherein said seal can includes a bonding portion connected to an outer diameter portion, said primary seal being built onto said bonding portion.

9. The combination seal assembly according to claim 8, wherein said bonding portion is a double walled ring having an inner ring wall and an outer ring wall, said primary seal being built onto at least one of said inner ring wall and said outer ring wall.

10. A combination seal assembly, comprising:
at least one can structure;
a primary seal built onto said at least one can structure and having at least one seal lip; and
a scraper seal built onto said at least one can structure and having at least one scraper lip, said at least one can structure supporting said primary seal and said scraper seal and allowing simultaneous installation of said at least one can structure, said primary seal, and said scraper seal into a hardware space; wherein said at least one can structure includes a seal can and a scraper can, said primary seal being built onto said seal can and said scraper seal being built onto said scraper can; further comprising an assembly can with an interior surface and a bearing placed against said interior surface, at least one of said seal can and said scraper can being pressed against said interior surface of said assembly can.

11. The combination seal assembly according to claim 1, further comprising a secondary seal having at least one secondary seal lip, said at least one can structure including a primary seal can, a secondary seal can, and a scraper seal can, said primary seal being built onto said primary seal can, said secondary seal being built onto said secondary seal can, and said scraper seal being built onto said scraper seal can.

12. The combination seal assembly according to claim 11, further comprising a casing holding said primary seal can, said secondary seal can, and said scraper seal can together.

13. The combination seal assembly according to claim 1, wherein at least one of said primary seal and said scraper seal comprises a rubber.

14. The combination seal assembly according to claim 1, wherein said at least one can structure is an exterior annular cup.

15. The combination seal assembly according to claim 1, wherein said at least one can structure is an interior annular cup.

* * * * *